(12) United States Patent
Yang et al.

(10) Patent No.: US 10,202,883 B2
(45) Date of Patent: Feb. 12, 2019

(54) COMMON RAIL ASSEMBLY, UREA INJECTION SYSTEM AND APPLICATION THEREOF

(71) Applicant: TENNECO (SUZHOU) EMISSION SYSTEM CO., LTD., Kunshan Suzhou, Jiangsu (CN)

(72) Inventors: Zhenqiu Yang, Kunshan Suzhou (CN);
Chao Gong, Kunshan Suzhou (CN);
Gaofeng Fan, Kunshan Suzhou (CN);
Daling Liu, Kunshan Suzhou (CN);
Haitao Zhang, Kunshan Suzhou (CN);
Anzhou Wu, Kunshan Suzhou (CN);
Shuai Guan, Kunshan Suzhou (CN)

(73) Assignee: TENNECO (SUZHOU) EMISSION SYSTEM CO., LTD., Kunshan Suzhou, Jiangsu (CN)

( * ) Notice: Subject to any disclaimer, the term of this patent is extended or adjusted under 35 U.S.C. 154(b) by 81 days.

(21) Appl. No.: 15/528,448

(22) PCT Filed: Nov. 12, 2015

(86) PCT No.: PCT/CN2015/094449
§ 371 (c)(1),
(2) Date: May 19, 2017

(87) PCT Pub. No.: WO2016/078538
PCT Pub. Date: May 26, 2016

(65) Prior Publication Data
US 2017/0328260 A1    Nov. 16, 2017

(30) Foreign Application Priority Data

Nov. 21, 2014 (CN) .......................... 2014 1 0671572
Mar. 11, 2015 (CN) .......................... 2015 1 0105796

(51) Int. Cl.
*F01N 3/00* (2006.01)
*F01N 11/00* (2006.01)
(Continued)

(52) U.S. Cl.
CPC .............. *F01N 11/005* (2013.01); *F01N 3/08* (2013.01); *F01N 3/2066* (2013.01); *F01N 3/28* (2013.01);
(Continued)

(58) Field of Classification Search
CPC ............ F01N 2590/10; F01N 2610/02; F01N 2610/14; Y02T 10/24
See application file for complete search history.

(56) References Cited

U.S. PATENT DOCUMENTS

| | | |
|---|---|---|
| 3,596,640 A | 8/1971 | Bloomfield |
| 3,908,371 A | 9/1975 | Nagai et al. |

(Continued)

FOREIGN PATENT DOCUMENTS

| | | |
|---|---|---|
| CN | 101493027 A | 7/2009 |
| CN | 101737133 A | 6/2010 |

(Continued)

OTHER PUBLICATIONS

European Search Report, dated Jun. 22, 2018.

*Primary Examiner* — Audrey K Bradley
*Assistant Examiner* — Anthony Ayala Delgado
(74) *Attorney, Agent, or Firm* — Harness, Dickey & Pierce, P.L.C.

(57) ABSTRACT

A common rail assembly used in a urea injection system, comprising at least a first common rail and a second common rail which are connected to each other, wherein the first common rail comprises a first housing, a pressure detecting device mounted on the first housing and a pressure adjusting device. The first housing comprises a first urea inlet channel, (Continued)

a first urea outlet channel, at least one first feeding inlet connected to the first urea inlet channel and at least one first back-flow outlet connected to the first urea outlet channel. The pressure detecting device is connected to the first urea inlet channel. The pressure adjusting device can connect/disconnect the first urea inlet channel to/from the first urea outlet channel. Also disclosed are a urea injection system and the application of the common rail assembly. A proper number of common rails selected based on different application requirements can be combined together by at least connecting the first common rail to the second common rail in series. The extension capability thereof is relatively high.

11 Claims, 8 Drawing Sheets

(51) Int. Cl.
F01N 3/08 (2006.01)
F01N 3/28 (2006.01)
F01N 3/20 (2006.01)
F01N 9/00 (2006.01)

(52) U.S. Cl.
CPC .............. F01N 11/00 (2013.01); F01N 3/20 (2013.01); F01N 9/002 (2013.01); F01N 2590/10 (2013.01); F01N 2610/02 (2013.01); F01N 2610/14 (2013.01); Y02T 10/24 (2013.01); Y02T 10/47 (2013.01)

(56) References Cited

U.S. PATENT DOCUMENTS

| | | | |
|---|---|---|---|
| 5,522,218 A | 6/1996 | Lane et al. | |
| 5,976,475 A | 11/1999 | Peter-Hoblyn et al. | |
| 6,006,515 A | 12/1999 | Wakamoto | |
| 6,125,629 A | 10/2000 | Patchett | |
| 6,182,444 B1 | 2/2001 | Fulton et al. | |
| 6,293,097 B1 | 9/2001 | Wu et al. | |
| 6,820,417 B2 | 11/2004 | May et al. | |
| 6,877,312 B2 | 4/2005 | Nakatani et al. | |
| 7,021,048 B2 | 4/2006 | Taylor, III et al. | |
| 7,040,290 B2 | 5/2006 | Kim | |
| 8,109,077 B2 | 2/2012 | Reba et al. | |
| 8,122,709 B2 | 2/2012 | Buerglin et al. | |
| 8,171,722 B2 | 5/2012 | Rodman et al. | |
| 8,381,514 B2 | 2/2013 | Salanta et al. | |
| 8,397,491 B2 | 3/2013 | Bauer et al. | |
| 8,402,750 B2 | 3/2013 | Floyd et al. | |
| 8,863,501 B2 | 10/2014 | Reusing et al. | |
| 8,904,760 B2 | 12/2014 | Mital | |
| 8,920,757 B1 | 12/2014 | Chandrapati et al. | |
| 8,938,949 B2 | 1/2015 | Branco et al. | |
| 8,943,808 B2 | 2/2015 | Li et al. | |
| 9,080,487 B2 | 7/2015 | Golin et al. | |
| 9,169,760 B2 | 10/2015 | Maguin et al. | |
| 9,222,388 B2 | 12/2015 | Kregling et al. | |
| 2004/0098978 A1 | 5/2004 | Tarabulski et al. | |
| 2004/0118109 A1 | 6/2004 | Gladden | |
| 2005/0069476 A1 | 3/2005 | Blakeman et al. | |
| 2006/0196169 A1 | 9/2006 | Ripper et al. | |
| 2007/0215209 A1* | 9/2007 | Street ................ F17C 5/06 137/263 |
| 2008/0028751 A1 | 2/2008 | Stroia et al. | |
| 2008/0087008 A1 | 4/2008 | Reba et al. | |
| 2008/0092531 A1 | 4/2008 | Suzuki et al. | |
| 2008/0282680 A1 | 11/2008 | Tachy et al. | |
| 2009/0025373 A1 | 1/2009 | Buerglin et al. | |
| 2009/0035195 A1 | 2/2009 | Robel | |
| 2009/0145400 A1* | 6/2009 | Hanneke ............ F02M 55/025 123/446 |
| 2009/0205316 A1 | 8/2009 | Dougnier et al. | |
| 2009/0223486 A1* | 9/2009 | Weizenauer ......... F02M 55/025 123/447 |
| 2010/0139260 A1 | 6/2010 | Rodman et al. | |
| 2010/0319320 A1 | 12/2010 | Mital et al. | |
| 2010/0319324 A1 | 12/2010 | Mital | |
| 2011/0000196 A1 | 1/2011 | Kasahara | |
| 2011/0047973 A1 | 3/2011 | Wilhelm et al. | |
| 2011/0146249 A1 | 6/2011 | Palluat de Besset et al. | |
| 2011/0154806 A1 | 6/2011 | Hoyte et al. | |
| 2011/0162347 A1 | 7/2011 | Katare et al. | |
| 2011/0197569 A1 | 8/2011 | Salanta et al. | |
| 2011/0203261 A1 | 8/2011 | Kotrba et al. | |
| 2012/0036842 A1 | 2/2012 | Nakamura | |
| 2012/0039779 A1 | 2/2012 | Maus et al. | |
| 2012/0131910 A1* | 5/2012 | Reusing ............... F01N 3/0253 60/295 |
| 2012/0260629 A1 | 10/2012 | Levin et al. | |
| 2013/0031890 A1 | 2/2013 | Shovels et al. | |
| 2013/0067892 A1 | 3/2013 | Minezawa et al. | |
| 2013/0118155 A1 | 5/2013 | Domon et al. | |
| 2013/0140383 A1 | 6/2013 | Thomas et al. | |
| 2013/0171050 A1 | 7/2013 | Adelman et al. | |
| 2013/0232958 A1 | 9/2013 | Ancimer et al. | |
| 2013/0299604 A1 | 11/2013 | Thomas et al. | |
| 2013/0343959 A1* | 12/2013 | Golin .................. F01N 3/103 422/170 |
| 2014/0047821 A1 | 2/2014 | Kawada et al. | |
| 2014/0053539 A1 | 2/2014 | Golin et al. | |
| 2014/0116027 A1 | 5/2014 | Ancimer | |
| 2014/0116545 A1 | 5/2014 | Gottwald | |
| 2014/0238504 A1* | 8/2014 | Kregling ............. F01N 3/2066 137/101.31 |
| 2014/0245722 A1 | 9/2014 | Naik et al. | |
| 2014/0360168 A1 | 12/2014 | Broderick et al. | |
| 2014/0363358 A1 | 12/2014 | Udd et al. | |
| 2015/0047327 A1 | 2/2015 | Overhoff et al. | |
| 2015/0052878 A1 | 2/2015 | Qi | |
| 2015/0096287 A1 | 4/2015 | Qi | |
| 2015/0167526 A1 | 6/2015 | Henry et al. | |
| 2015/0196878 A1 | 7/2015 | Nunez et al. | |
| 2015/0204226 A1 | 7/2015 | Moore | |
| 2015/0224447 A1 | 8/2015 | Nishizawa et al. | |
| 2015/0252707 A1 | 9/2015 | Nishizawa | |
| 2015/0275730 A1 | 10/2015 | Gupta et al. | |
| 2015/0336052 A1 | 11/2015 | Hogan et al. | |
| 2016/0040575 A1 | 2/2016 | Zhang et al. | |
| 2016/0047285 A1 | 2/2016 | Alcini et al. | |
| 2016/0160725 A1* | 6/2016 | Hudgens ............. F01N 3/2066 60/274 |
| 2016/0230720 A1* | 8/2016 | Hackett ............... F02M 37/08 |
| 2017/0021881 A1 | 1/2017 | Jacobsen et al. | |
| 2017/0082003 A1* | 3/2017 | Nilsson ................ F01N 3/021 |
| 2017/0218812 A1 | 8/2017 | Nilsson et al. | |
| 2017/0218813 A1 | 8/2017 | Nilsson et al. | |

FOREIGN PATENT DOCUMENTS

| | | |
|---|---|---|
| CN | 101892888 A | 11/2010 |
| CN | 102713179 A | 10/2012 |
| CN | 102906385 A | 1/2013 |
| CN | 103348106 A | 10/2013 |
| CN | 104074740 A | 10/2014 |
| CN | 104110293 A | 10/2014 |
| CN | 104428503 A | 3/2015 |
| CN | 204267135 U | 4/2015 |
| CN | 204267138 U | 4/2015 |
| CN | 204312169 U | 5/2015 |
| CN | 104763497 A | 7/2015 |
| CN | 204646374 U | 9/2015 |
| CN | 105026714 A | 11/2015 |
| DE | 10349143 A1 | 5/2005 |
| DE | 102006007554 A1 | 8/2007 |
| DE | 102010029340 A1 | 12/2011 |
| DE | 102012005486 A1 | 9/2013 |
| EP | 1752632 A1 | 2/2007 |
| JP | 2006170013 A | 6/2006 |

(56) References Cited

FOREIGN PATENT DOCUMENTS

| | | | |
|---|---|---|---|
| JP | 2007327377 | A | 12/2007 |
| JP | 2014020310 | A | 2/2014 |
| WO | 2013123865 | A1 | 8/2013 |

* cited by examiner

COMMON RAIL ASSEMBLY, UREA INJECTION SYSTEM AND APPLICATION THEREOF

CROSS REFERENCE TO RELATED APPLICATIONS

This application is a U.S. National Phase Application under 35 U.S.C. 371 of International Application No. PCT/CN2015/094449 filed on Nov. 12, 2015 and published in Chinese as WO 2016/078538 A1 on May 26, 2016. This application is based on and claims the benefit of priority from Chinese Patent Application No. 201510105796.1 filed Mar. 11, 2015 and Chinese Patent Application No. 201410671572.2 filed Nov. 21, 2014. The entire disclosures of all of the above applications are incorporated herein by reference.

TECHNICAL FIELD

The present invention relates to a common-rail assembly, a urea injection system, and the application thereof in the technical field of post-treatment of engine exhaust.

BACKGROUND ART

The common-rail system has been applied for a long time in the fuel injection system of engines. The structure of the common rail for fuel injection is greatly constrained because it needs to withstand a very high pressure. Since a cylindrical structure can withstand a higher pressure than other structures, the cylindrical structure is adopted for almost all existing common rails for fuel injection.

As the standards for exhaust emission in countries all over the world are increasingly becoming more strict, higher requirements are put forward for the urea injection system used for exhaust treatment. How to control the pressure in the urea injection system is a common technical problem in the industry.

In addition, for exhaust treatment of a high-power engine, the pipeline of the urea injection system is often very long and the pressure loss is relatively great, and therefore it is necessary to provide a common rail which can stabilize the system pressure, the application of the common rail, and a urea injection system having the common rail.

In addition, when a common rail is applied in the post-treatment system of a high-power engine, it is often necessary to design another common rail matching it to meet different design requirements. Such a solution greatly increases the cost.

Therefore, it is necessary to design a new common-rail assembly based on the combination of a plurality of common rails to solve the above-mentioned problem.

SUMMARY OF THE INVENTION

The objective of the present invention is to provide a common-rail assembly with high scalability, a urea injection system, and the application thereof.

To achieve the above-mentioned objective, the following technical solution is adopted for the present invention: a common-rail assembly, used in a urea injection system, said common-rail assembly comprising at least a first common rail and a second common rail which are connected to each other, wherein said first common rail comprises a first housing, and a pressure detecting device and a pressure adjusting device installed on said first housing; said first housing comprises a first urea inlet channel where a urea solution enters, a first urea outlet channel where the urea solution flows out, at least one first feeding inlet connected to said first urea inlet channel, and at least one first back-flow outlet connected to said first urea outlet channel; said pressure detecting device is connected to said first urea inlet channel; said pressure adjusting device is connected between said first urea inlet channel and said first urea outlet channel, and said pressure adjusting device can connect or disconnect said first urea inlet channel and said first urea outlet channel; said second common rail comprises a second housing, and said second housing comprises a second urea inlet channel connected to said first urea inlet channel, a second urea outlet channel connected to said first urea outlet channel, at least one second feeding inlet connected to said second urea inlet channel, and at least one second back-flow outlet connected to said second urea outlet channel.

As a further improved technical solution of the present invention, said first housing roughly takes the shape of a cuboid, and comprises a first end face, a second end face, a third end face, and a fourth end face, wherein said first end face is set opposite said second end face, and said third end face is set opposite said fourth end face; said first urea inlet channel and said first urea outlet channel run through said first end face and/or second end face, said first feeding inlet runs through said third end face, and said first back-flow outlet runs through said fourth end face.

As a further improved technical solution of the present invention, a plurality of said first feeding inlets are provided, and said first common rail is equipped with first feeding connectors connected to each first feeding inlet; a plurality of said first back-flow outlets are provided, and said first common rail is equipped with first back-flow connectors connected to each first back-flow outlet; wherein the number of said first back-flow connectors is the same as the number of said first feeding connectors.

As a further improved technical solution of the present invention, said first feeding connectors are arranged at intervals between said first end face and said second end face, said first back-flow connectors are also arranged at intervals between said first end face and said second end face, said first feeding connectors are in the opposite direction to said first back-flow connectors, and each first feeding inlet is aligned with the corresponding first back-flow outlet.

As a further improved technical solution of the present invention, a urea is mass sensor is installed on at least one first feeding connector.

As a further improved technical solution of the present invention, said first urea inlet channel and said first urea outlet channel are parallel to each other, said first feeding connector is perpendicular to said first urea inlet channel, and said back-flow connector is perpendicular to said first urea outlet channel.

As a further improved technical solution of the present invention, said common-rail assembly comprises a first connection pipe which connects said first urea inlet channel and said second urea inlet channel, and a second connection pipe which connects said first urea outlet channel and said second urea outlet channel.

As a further improved technical solution of the present invention, said first housing further comprises a front face perpendicular to said first, second, third, and fourth end faces, and a back face opposite said front face, wherein a mounting hole passing through said back face is provided at each of the four corners of said front face.

As a further improved technical solution of the present invention, said first housing further comprises a front face perpendicular to said first, second, third, and fourth end faces, and a back face opposite said front face, wherein a mounting groove used for mounting said pressure adjusting device is set on said back face.

As a further improved technical solution of the present invention, said pressure adjusting device is a pressure control valve, and said pressure control valve is opened when said pressure sensor detects that the pressure is greater than a set value.

The present invention further relates to a urea injection system used for treating exhaust of engines. Said urea injection system comprises a urea tank, a fluid delivery device used to pump out urea solution in said urea tank, a common-rail assembly connected to said fluid delivery device, nozzles connected to said common-rail assembly, and a controller used to control said urea injection system, said fluid delivery device comprising a is pump used to pump a urea solution, and said common-rail assembly being the above-mentioned common-rail assembly, wherein said nozzles are connected to said first feeding inlets.

The present invention further relates to the application of the above-mentioned common rail in the exhaust treatment system of a diesel engine with a power rating above 500 kilowatts.

Compared with the prior art, the first common rail in the present invention is equipped with a first urea inlet channel where a urea solution enters, and a first urea outlet channel where the urea solution flows out, and said pressure adjusting device can connect or disconnect said first urea inlet channel and said first urea outlet channel to adjust the system pressure. In addition, by at least connecting the first common rail and the second common rail in series, an appropriate number of common rails can be combined according to different application requirements so that the scalability is very high.

DESCRIPTION OF THE PARTICULAR EMBODIMENTS

Figure 1:
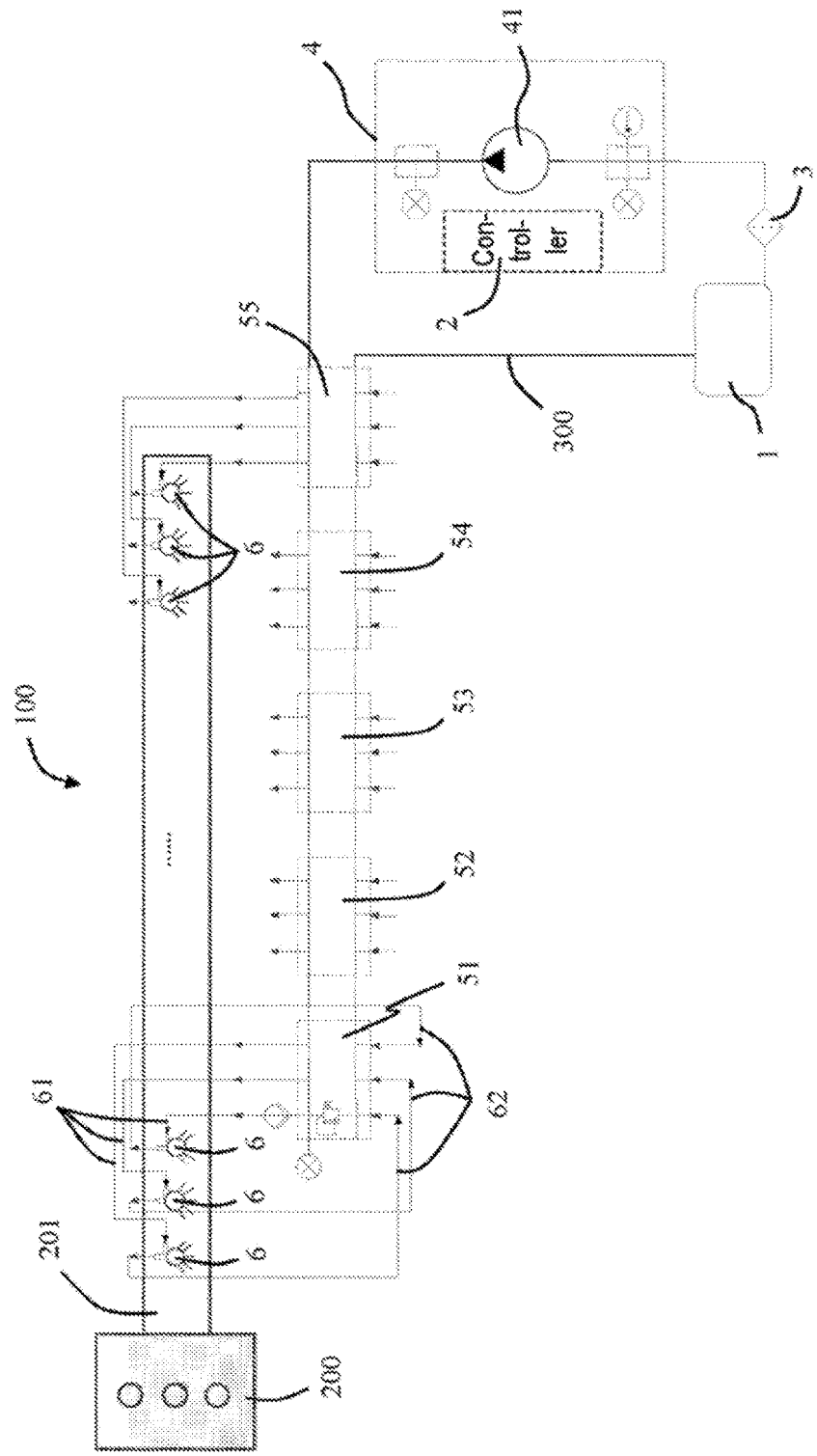
FIG. 1 is a schematic diagram of the urea injection system used for exhaust treatment of engines.
Figure 2:
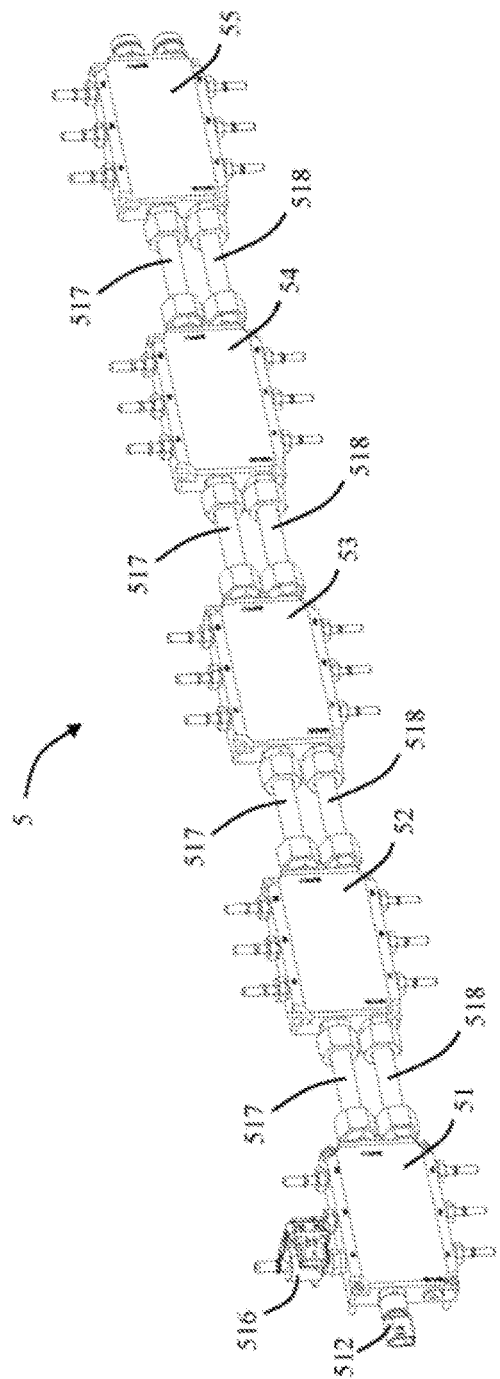
FIG. 2 is a 3-D view of the common-rail assembly shown in FIG. 1.
Figure 3:
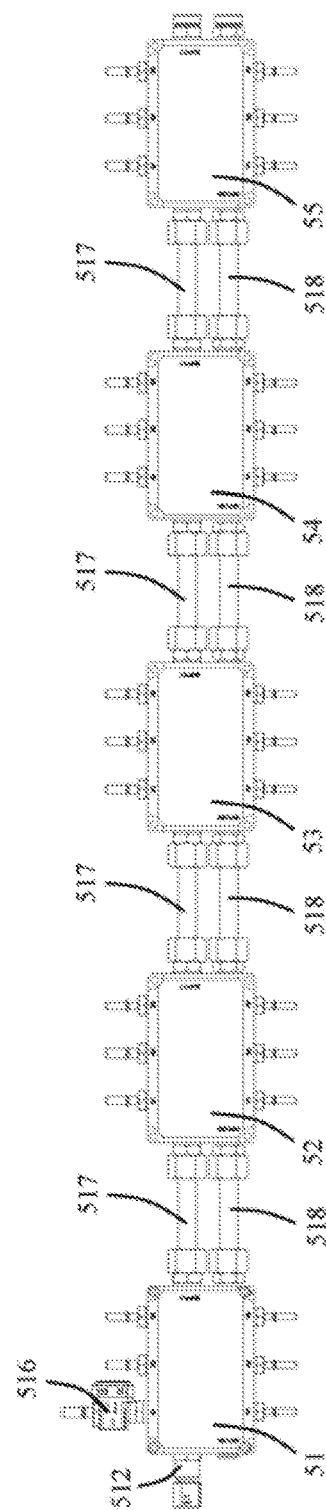
FIG. 3 is a top view of FIG. 2.
Figure 4:
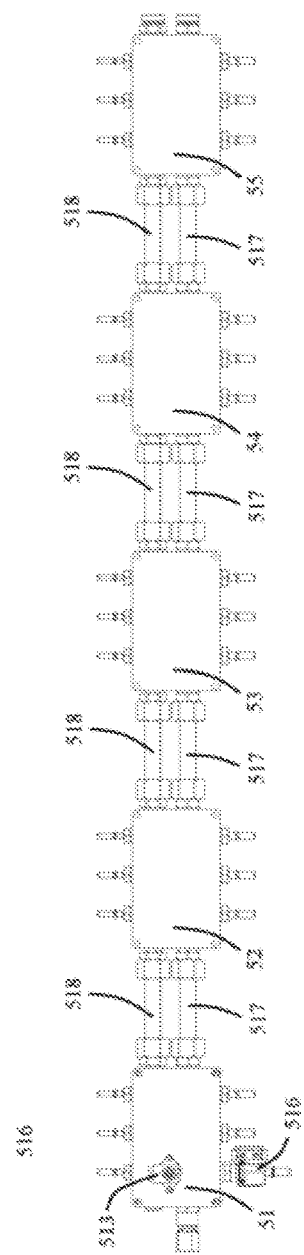
FIG. 4 is a bottom view of FIG. 2.
Figure 5:
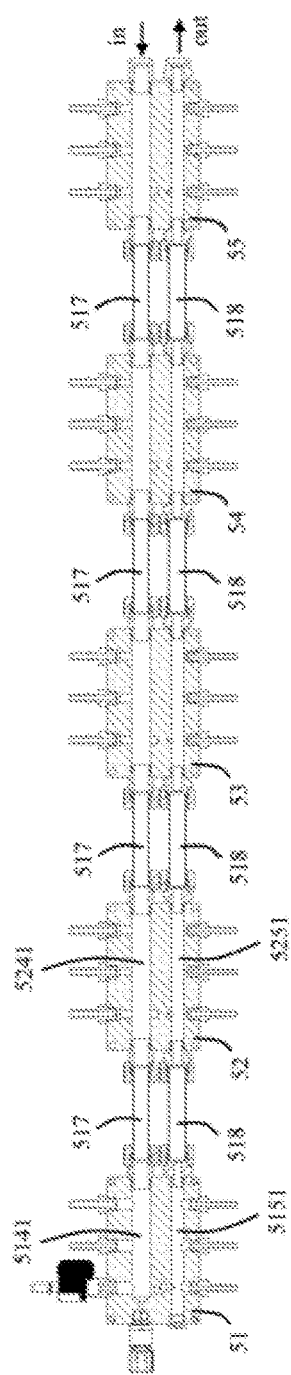
FIG. 5 is a cutaway view of the common-rail assembly of the present invention in a certain position.
Figure 6:
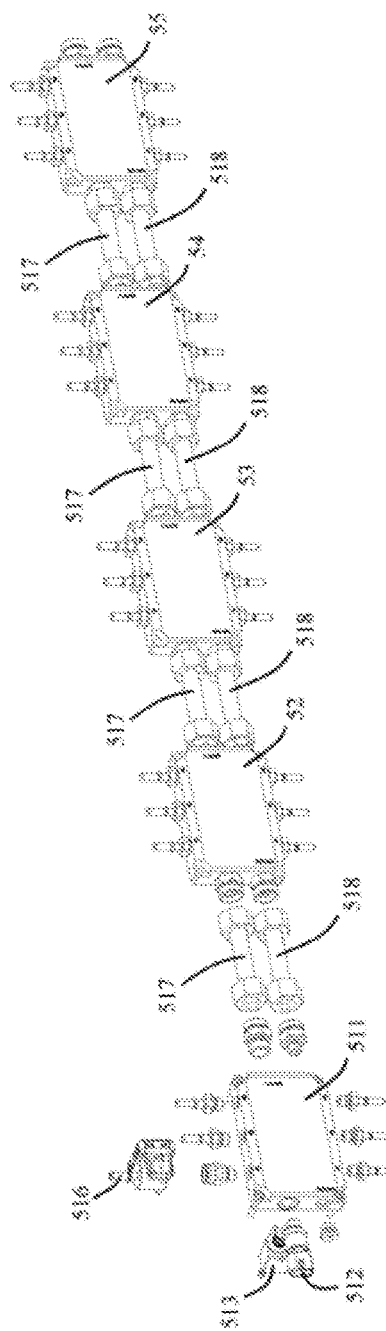
FIG. 6 is a local exploded view of FIG. 2.
Figure 7:
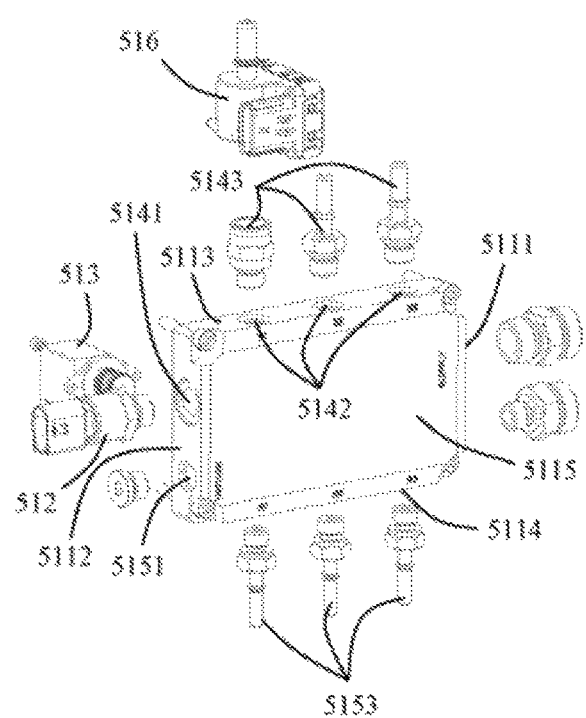
FIG. 7 is a 3-D exploded view of the first common rail shown in FIG. 2.
Figure 8:
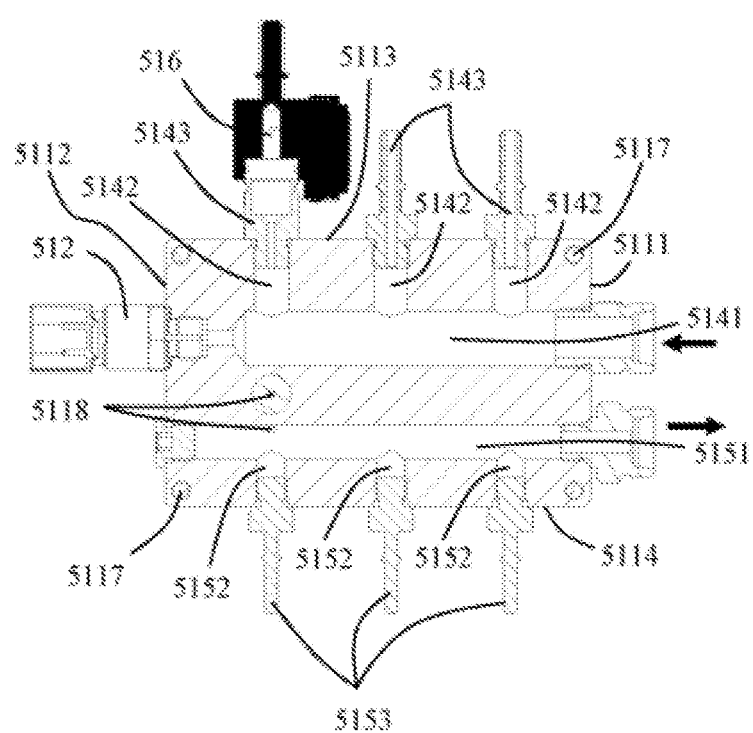
FIG. 8 is a cutaway view of the first common rail shown in FIG. 2.

As shown in FIG. 1, the present invention discloses a urea injection system (100) which can be used for exhaust post-treatment of high-power engines. Said urea injection system (100) comprises a urea tank (1), a filter assembly (3) connected to said urea tank (1), a fluid delivery device (4) used for delivering said urea solution, a common-rail assembly (5) connected to said fluid delivery device (4), a plurality of nozzles (6) connected to said common-rail assembly (5), and a controller (2) used to control said urea injection system (100).

In the illustrated implementation mode of the present invention, said engine (200) is a high-power engine with a power rating above 500 kilowatts. Said fluid delivery device (4) is equipped with a pump (41) (for example, gear pump) used to pump a urea solution. In the illustrated implementation mode of the present invention, said controller (2) is installed on said fluid delivery device (4) to realize integration. Said nozzle (6) is used to inject an atomized urea solution into the engine exhaust pipe (201). The atomized urea solution is decomposed into ammonia in the engine exhaust pipe (201), and said ammonia reacts with nitrogen oxides in the exhaust to reduce the emission of nitrogen oxides. Considering that the principle of exhaust treatment technology is known to those skilled in the art, detailed description of it is omitted here.

As shown in FIG. 2 to FIG. 8, in the illustrated implementation mode of the present invention, said common-rail assembly (5) comprises a first common rail (51), a second common rail (52), a third common rail (53), a fourth common rail (54), and a fifth common rail (55) which are connected in series. Said second, third, fourth, and fifth common rails (52, 53, 54, and 55) are the same in structure, and said first common rail (51) is very similar to said second common rail (52) in structure so that they can share equipment/mold to save on manufacturing cost. The following describes in detail the first common rail (51), for example.

As shown in FIG. 19 and FIG. 20, said first common rail (51) is used to adjust the pressure in the urea injection system (100). To be specific, said first common rail (51) comprises a first housing (511), and a pressure detecting device (512) and a pressure adjusting device (513) installed on is said first housing (511). Said first housing (511) roughly takes the shape of a cuboid, and comprises a first end face (5111), a second end face (5112), a third end face (5113), a fourth end face (5114), a front face (5115), and a back face (5116) opposite said front face (5115) (see FIG. 4), wherein, said first end face (5111) is set opposite said second end face (5112); said third end face (5113) is set opposite said fourth end face (5114); said front face (5115) is perpendicular to all of said first end face (5111), second end face (5112), third end face (5113), and fourth end face (5114). A mounting hole (5117) is provided at the four corners of said front face (5115) to install said first common rail (51) in a predetermined position (see FIG. 8). A mounting groove (5118) used for mounting said pressure adjusting device (513) is set on said back face (5116).

Said first housing (511) further comprises a first urea inlet channel (5141) where a urea solution enters, a first urea outlet channel (5151) where the urea solution flows out, a plurality of first feeding inlets (5142) connected to said first urea inlet channel (5141), and a plurality of first back-flow outlets (5152) connected to said first urea outlet channel (5151). Said first urea inlet channel (5141) and said first urea outlet channel (5151) run through said first end face (5111) and/or second end face (5112). In the illustrated implementation mode of the present invention, said first urea inlet channel (5141) and said first urea outlet channel (5151) both run through said first end face (5111). Said first urea inlet channel (5141) and said first urea outlet channel (5151) are parallel to each other, thus facilitating machining. In the illustrated implementation mode of the present invention, said third end face (5113) is equipped with three first feeding inlets (5142) and three first feeding connectors (5143) connected to said first feeding inlets (5142). Each of first feeding connectors (5143) is perpendicular to said first urea inlet channel (5141). Said three first feeding connectors (5143) are arranged at intervals between said first end face (5111) and second end face (5112). In the illustrated implementation mode of the present invention, a urea mass sensor (516) is installed on the first feeding connector (5143) close to said third end face (5113). Of course, in other implementation modes, said urea mass sensor (516) can also be installed on any first feeding connector (5143); or a urea mass sensor (516) can also be installed on all three first feeding connectors (5143).

In the illustrated implementation mode of the present invention, the number of said first back-flow outlets (5152) is also three, and three first back-flow outlets (5152) and three first back-flow connectors (5153) connected to said first back-flow outlets (5152) are set on said fourth end face (5114). Each of the first back-flow connectors (5153) is perpendicular to said first urea outlet channel (5151). Said three first back-flow connectors (5153) are also arranged at intervals between said first end face (5111) and second end face (5112). Said first feeding inlets (5142) run through said third end face (5113), and said first back-flow outlets (5152) run through said fourth end face (5114). The number of said first back-flow connectors (5153) is the same as the number of said first feeding connectors (5143), but their mounting directions are the opposite. Each first feeding inlet (5142) is aligned with a corresponding first back-flow outlet (5152).

In the illustrated implementation mode of the present invention, said pressure detecting device (512) is a pressure sensor, which is installed on said second end face (5112) and connects said first urea inlet channel (5141). In the illustrated implementation mode of the present invention, said pressure adjusting device (512) is a pressure control valve, which is installed in said mounting groove (5118). Functionally, said pressure control valve is connected between said first urea inlet channel (5141) and said first urea outlet channel (5151), and said pressure control valve can connect or disconnect said first urea inlet channel (5141) and said first urea outlet channel (5151). For example, when said pressure sensor detects that the pressure in said first urea inlet channel (5141) is greater than a set value, said controller (2) opens said pressure control valve to realize pressure relief.

The first common rail (51) in the present invention is quite different from the existing common rails for fuel injection. First of all, a lot of data analysis shows that the pressure which the common rail of the present invention, applied in the urea injection system (100), needs to withstand is far lower than what the common rail for fuel injection withstands. Based on such analysis, the cuboid first housing (511) disclosed in the present invention has high machinability. More importantly, this provides a feasible solution for the integration of the first urea outlet channel (5151) into said first common rail (51). In the illustrated implementation mode of the present invention, the diameter of said first urea inlet channel (5141) is of course greater than the diameter of said first urea outlet channel (5151). The reason for such a design is that scientific analysis shows that the pressures which said first urea inlet channel (5141) and said first urea outlet channel (5151) need to withstand are also different.

Said second common rail (52) is very similar to said first common rail (51) in structure. Said second common rail is briefly described as follows:

Said second common rail (52) comprises a second housing (521), and said second housing (521) comprises a second urea inlet channel (5241) connected to said first urea inlet channel (5141), a second urea outlet channel (5251) connected to said first urea outlet channel (5151), a plurality of second feeding inlets (5242) connected to said second urea inlet channel (5241), and a plurality of second back-flow outlets (5252) connected to said second urea outlet channel (5251).

In addition, said common-rail assembly (5) further comprises a first connection pipe (517) which connects said first urea inlet channel (5141) and said second urea inlet channel (5241), and a second connection pipe (518) which connects said first urea outlet channel (5241) and said second urea outlet channel (5251). Said first connection pipe (517) and said second connection pipe (518) are both hollow pipes so that a urea solution can flow in the first common rail (51) and the second common rail.

It should be understood that the present invention comprises a plurality of first connection pipes (517) and a plurality of second connection pipes (518) to connect said first common rail (51), second common rail (52), third common rail (53), fourth common rail (54), and fifth common rail (55) in series. With such settings, an appropriate number of common rails can be selected and combined according to different application requirements. The scalability of the present invention is high.

In addition, the pressure control valve installed on said first common rail (51) has three functions: 1. helping to build up the pressure in the urea pipeline, 2. stabilizing and controlling the pressure after the pressure is built is up, 3. with the aid of contra-rotations of said pump (41), drawing the air in said urea tank (1) into the pipeline of said urea injection system to evacuate the urea solution from said pipeline before said urea injection system (100) stops.

To be specific, when the system just starts to build up pressure, a lot of air may exist in the pipeline. However, the compressibility of air easily leads to a pressure buildup failure. The pressure control valve designed in the present invention skillfully solves the problem. When the system just starts to build up pressure, said controller (2) controls the opening of said pressure control valve (for example, keeps said pressure control valve at a certain fixed opening angle or a variable opening angle) to connect said first urea inlet channel (5141) and said first urea outlet channel (5151) to provide one channel to release the air in the pipeline so that pressure can quickly be built up in the pipeline.

After the pressure buildup of the system is completed, said controller (2) will quickly adjust the opening angle of said pressure control valve to ensure that the urea pressure in said first common rail (51) is maintained around a set pressure and basically remains constant, thus achieving the aim of adjusting the pressure by controlling the back-flow volume of the urea solution.

Before said urea injection system (100) stops, said controller (2) opens said pressure control valve, said pump (41) contra-rotates to draw the air in said urea tank (1) into the pipeline of said urea injection system to evacuate the urea solution from said pipeline. It should be noted that "before said urea injection system (100) stops" means that said controller (2) has already received the signal indicating that the system is to stop. At this time, said nozzle (6) has already stopped injection, but said pump (41) is still rotating (for example, contra-rotating). The purpose of evacuating the urea solution from said pipeline is to prevent the system from being damaged by freezing or expansion of the urea solution.

In the illustrated implementation mode, three nozzles (6) are set for each common rail. Each nozzle (6) is equipped with delivery pipelines (61) connected to the corresponding feeding inlets and back-flow pipelines (62) is connected to the corresponding back-flow outlets. With such settings, on the one hand, said nozzles (6) can inject a urea solution into said exhaust pipe (201) for a chemical reaction, and on the other hand, the urea solution flowing back can be utilized to cool said nozzles (6). The urea solution flowing back first gathers in the corresponding common rail through back-flow pipelines (62), and then uniformly flows back to said urea tank (1) through the back-flow pipeline (300). In the prior art, a solution where said flow-back pipelines (62) are directly introduced to said urea tank (1) is usually adopted. In such a solution, each nozzle (6) requires an independent back-flow pipeline (62), and thus the cost is very high. In addition, in the applications of the present invention, especially in the exhaust treatment system of a high-power engine, the pipelines between said urea tank (1) and said nozzles (6) are often long, and the existing back-flow design cannot satisfy the requirements.

In addition, the above-mentioned embodiments are only used to describe the present invention, but not restrict the technical solutions described for the present invention. The understanding of the specification, for example, "run through from front to back" (meaning "run through before other parts are installed"), and the description of directions such as front, back, left, right, top, and bottom, should be based on those skilled in the art. Although a detailed description of the present invention is given in the specification with reference to the above-mentioned embodiments, those skilled in the art should understand that a person skilled in the art can still make modifications to or equivalent replacements in the present invention. Technical solutions and improvements without departing from the spirit and scope of the present invention should all fall within the scope of the claims of the present invention.

The invention claimed is:

1. A common-rail assembly used in a urea injection system, characterized in that said common-rail assembly comprises at least a first common rail and a second common rail which are connected to each other, wherein said first common rail comprises a first housing, and a pressure detecting device and a pressure adjusting device installed on said first housing; said first housing comprises a first urea inlet channel where a urea solution enters, a first urea outlet channel where the urea solution flows out, at least one first feeding inlet connected to said first urea inlet channel, and at least one first back-flow outlet connected to said first urea outlet channel; said pressure detecting device is connected to said first urea inlet channel; said pressure adjusting device is connected between said first urea inlet channel and said first urea outlet channel, and said pressure adjusting device can connect or disconnect said first urea inlet channel and said first urea outlet channel; said second common rail comprises a second housing, and said second housing comprises a second urea inlet channel connected to said first urea inlet channel, a second urea outlet channel connected to said first urea outlet channel, at least one second feeding inlet connected to said second urea inlet channel, and at least one second back-flow outlet connected to said second urea outlet channel, wherein said first housing roughly takes the shape of a cuboid, and comprises a first end face, a second end face, a third end face, and a fourth end face, wherein said first end face is set opposite said second end face, and said third end face is set opposite said fourth end face; said first urea inlet channel and said first urea outlet channel run through said first end face and/or second end face, said first feeding inlet runs through said third end face, and said first back-flow outlet runs through said fourth end face.

2. The common-rail assembly as claimed in claim 1, wherein a plurality of said first feeding inlets are provided, and said first common rail is equipped with first feeding connectors connected to each first feeding inlet; a plurality of said first back-flow outlets are provided, and said first common rail is equipped with first back-flow connectors connected to each first back-flow outlet; wherein the number of said first back-flow connectors is the same as the number of said first feeding connectors.

3. The common-rail assembly as claimed in claim 2, wherein said first feeding connectors are arranged at intervals between said first end face and said second end face, said first back-flow connectors are also arranged at intervals between said first end face and said second end face, said first feeding connectors are in the opposite direction to said first back-flow connectors, and each first feeding inlet is aligned with the corresponding first back-flow outlet.

4. The common-rail assembly according to claim 2, wherein a urea mass sensor is installed on at least one first feeding connector.

5. The common-rail assembly as claimed in claim 1, wherein said first urea inlet channel and said first urea outlet channel are parallel to each other, said first feeding connector is perpendicular to said first urea inlet channel, and said back-flow connector is perpendicular to said first urea outlet channel.

6. The common-rail assembly as claimed in claim 1, wherein said common-rail assembly comprises a first connection pipe which connects said first urea inlet channel and said second urea inlet channel, and a second connection pipe which connects said first urea outlet channel and said second urea outlet channel.

7. The common-rail assembly as claimed in claim 1, wherein said first housing further comprises a front face perpendicular to said first, second, third, and fourth end faces, and a back face opposite said front face, wherein a mounting hole passing through said back face is provided at each of the four corners of said front face.

8. The common-rail assembly as claimed in claim 1, wherein said first housing further comprises a front face perpendicular to said first, second, third, and fourth end faces, and a back face opposite said front face, wherein a mounting groove used for mounting said pressure adjusting device is set on said back face.

9. The common-rail assembly as claimed in claim 8, wherein said pressure adjusting device is a pressure control valve, and said pressure control valve is opened when said pressure detecting device detects that the pressure is greater than a set value.

10. A urea injection system used for treating exhaust of engines, said urea injection system comprising a urea tank, a fluid delivery device used to pump out urea solution in said urea tank, a common-rail assembly connected to said fluid delivery device, nozzles connected to said common-rail assembly, and a controller used to control said urea injection system, said fluid delivery device comprising a pump used to pump a urea solution, and said common-rail assembly being the common-rail assembly as claimed in claim 1, wherein said nozzles are connected to said first feeding inlets.

11. The application of a common-rail assembly in the exhaust post-treatment system of a diesel engine with a power rating above 500 kilowatts, wherein said common-rail assembly is the common-rail assembly as claimed in claim 1.

* * * * *